United States Patent
Granstam

(10) Patent No.: US 10,623,035 B2
(45) Date of Patent: Apr. 14, 2020

(54) WIRELESS COMMUNICATION NETWORK NODE ARRANGED FOR REDUCTION OF PASSIVE INTERMODULATION

(71) Applicant: Telefonaktiebolaget LM Ericsson (publ), Stockholm (SE)

(72) Inventor: Bo Granstam, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/308,042

(22) PCT Filed: Jun. 20, 2016

(86) PCT No.: PCT/EP2016/064127
§ 371 (c)(1),
(2) Date: Dec. 7, 2018

(87) PCT Pub. No.: WO2017/220104
PCT Pub. Date: Dec. 28, 2017

(65) Prior Publication Data
US 2019/0222241 A1 Jul. 18, 2019

(51) Int. Cl.
*H04W 56/00* (2009.01)
*H04B 1/10* (2006.01)
(Continued)

(52) U.S. Cl.
CPC ............. *H04B 1/109* (2013.01); *H04B 1/525* (2013.01); *H04W 72/0453* (2013.01); *H04W 72/0473* (2013.01)

(58) Field of Classification Search
CPC ... H04B 1/109; H04B 1/525; H04W 72/0453; H04W 72/0473
(Continued)

(56) References Cited

U.S. PATENT DOCUMENTS

| 8,890,619 B2 * | 11/2014 | Wyville | H04B 1/109 |
| | | | 327/156 |
| 2011/0075754 A1 * | 3/2011 | Smith | H04B 1/109 |
| | | | 375/285 |

FOREIGN PATENT DOCUMENTS

GB  2 511 865 A  9/2014

OTHER PUBLICATIONS

International Search Report and Written Opinion of the International Searching Authority for International Application No. PCT/EP2016/064127 dated Feb. 15, 2017.

* cited by examiner

*Primary Examiner* — Sai Ming Chan
(74) *Attorney, Agent, or Firm* — Sage Patent Group

(57) ABSTRACT

The present disclosure relates to a wireless communication network node comprising an antenna arrangement, a transmitter arrangement that is arranged to transmit output signals of a first frequency band, and a receiver arrangement that is arranged to receive input signals of a second frequency band. The node further comprises a first power distribution device that is arranged to distribute power between said antenna arrangement and both of said transmitter arrangement and said receiver arrangement. The node further comprises an oscillator that is arranged to supply an additional signal of a third frequency band that is added to the output signals. The frequencies comprised in the third frequency band exceed the frequencies comprised in the first frequency band. The node further comprises a receiver filter that is arranged to prevent the additional signal to reach the receiver arrangement.

6 Claims, 3 Drawing Sheets

(51) Int. Cl.
*H04B 1/525* (2015.01)
*H04W 72/04* (2009.01)
(58) Field of Classification Search
USPC .......................................................... 370/329
See application file for complete search history.

# WIRELESS COMMUNICATION NETWORK NODE ARRANGED FOR REDUCTION OF PASSIVE INTERMODULATION

CROSS REFERENCE TO RELATED APPLICATIONS

This application is a 35 U.S.C. § 371 national stage application of PCT International Application No. PCT/EP2016/064127, filed on Jun. 20, 2016, the disclosure and content of which is incorporated by reference herein in its entirety.

TECHNICAL FIELD

The present disclosure relates to a wireless communication network node comprising an antenna arrangement, a transmitter arrangement and a receiver arrangement. The wireless communication network node further comprises a first power distribution device that is arranged to distribute power between said antenna arrangement and both of said transmitter arrangement and said receiver arrangement.

BACKGROUND

In a wireless communication network, there are wireless communication devices in the form of communication nodes, for example base stations. At such nodes, passive intermodulation (PIM) often occurs when signals are present in a passive device that exhibits some non-linear behavior. More in detail, PIM occurs when a high power transmit signal is passed through a passive device that exhibits a non-linearity, where such a non-linear passive device is referred to as a PIM source. The PIM source may be a non-linear component in a transmit path of the wireless communication device such as, for example, a cable, a connector, a duplex filter, an antenna of the wireless communication device, or the like. The PIM source may alternatively be constituted by an object that is external to the node, for example a fence. There may of course be multiple PIM sources.

The PIM created by a PIM source includes multiple Intermodulation Products (IMP:s), for example of a 2nd order, a 3rd order, etc., of the transmit signal. When any one of the IMP:s fall within a passband of a receiver of the node, a resulting PIM distortion is introduced into the received signal and, as a result, the receiver is desensitized. PIM distortion is particularly problematic for multi-carrier or multi-band nodes. Multi-carrier or multi-band signals are an important characteristic of modern wireless communication standards, such as for example Long Term Evolution (LTE) as well as multi-standard, or multi-band, nodes. As such, PIM distortion is becoming an increasingly important problem that needs to be addressed.

One previous approach to addressing PIM distortion is described in US 2011/0075754, where PIM distortion is estimated by modeling the PIM distortion with a polynomial model in the digital domain at baseband.

PIM cancellation using tunable non-linear circuits is described in U.S. Pat. No. 8,890,619 B2.

These previous approaches are however relatively inefficient and complicated.

There is thus a need for an uncomplicated and efficient reduction of PIM in a wireless communication network node.

SUMMARY

It is an object of the present disclosure to provide an uncomplicated and efficient reduction of PIM in a wireless communication network node.

Said object is obtained by means of a wireless communication network node comprising an antenna arrangement, a transmitter arrangement that is arranged to transmit output signals of a first frequency band, a receiver arrangement that is arranged to receive input signals of a second frequency band. The node also comprises a first power distribution device that is arranged to distribute power between the antenna arrangement and both of said transmitter arrangement and said receiver arrangement. The node further comprises an oscillator that is arranged to supply an additional signal of a third frequency band that is added to the output signals. The frequencies comprised in the third frequency band exceed the frequencies comprised in the first frequency band. The node further comprises a receiver filter that is arranged to prevent the additional signal from reaching the receiver.

According to an example, the additional signal is in the form of a continuous wave having one main frequency.

According to another example, the node comprises a second power distribution device that is arranged to add the additional signal to the output signals that are arranged to be radiated by the antenna arrangement.

According to another example, the node comprises an additional antenna arrangement. The oscillator is arranged to radiate the additional signal via the additional antenna arrangement such that the additional signal is added to the output signals in the air.

More examples are disclosed in the dependent claims.

A number of advantages are obtained by means of the present disclosure. Mainly, an uncomplicated and efficient reduction of PIM in a wireless communication network node is obtained, which is easy to implement and does not require any signal processing.

BRIEF DESCRIPTION OF THE DRAWINGS

The present disclosure will now be described more in detail with reference to the appended drawings, where.

DETAILED DESCRIPTION

Figure 1:
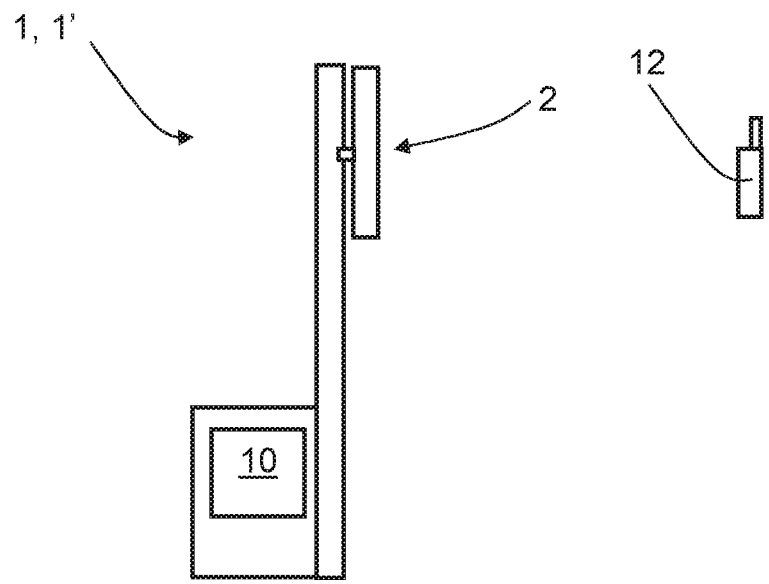
FIG. 1 shows a schematic side view of a node in a wireless communication network.

With reference to FIG. 1, there is a node 1 in a wireless communication network, constituting a wireless communication network node 1 that comprises an antenna arrangement 2 and a radio arrangement 10. The node 1 is shown to communicate with at least one other wireless device 12.

Figure 2:
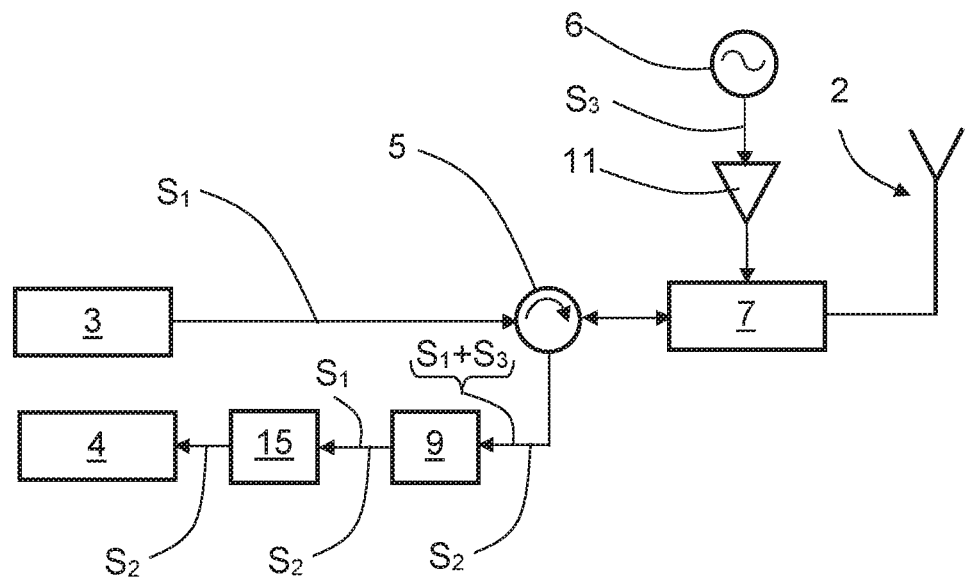
FIG. 2 shows a schematic view of an arrangement according to a first example of the present disclosure.

With reference to FIG. 2, showing a first example, the node 1 comprises a transmitter arrangement 3 that is arranged to transmit output signals $S_1$ of a first frequency band $B_1$, a receiver arrangement 4 that is arranged to receive input signals $S_2$ of a second frequency band $B_2$, and a first power distribution device 5 that is arranged to distribute power between the antenna arrangement 2 and both of said transmitter arrangement 3 and said receiver arrangement 4.

The first power distribution device 5 is arranged to forward the output signals $S_1$ from the transmitter arrangement 3 to the antenna arrangement 2 but to suppress the output signals $S_1$ towards the receiver arrangement 4. The first power distribution device 5 is also arranged to forward the input signals $S_2$ from the antenna arrangement 2 to the receiver arrangement 4, but to suppress the input signals $S_2$ towards the transmitter arrangement 3. The input signals $S_2$ have in this example been transmitted to the node 1 from the wireless device 12.

For this purpose, according to some aspects, the first power distribution device 5 is constituted by a circulator and/or a duplex filter such as a diplexer.

According to the present disclosure, the node 1 further comprises an oscillator 6 that is arranged to supply an additional signal $S_3$ of a third frequency band $B_3$ that is added to the output signals $S_1$. The frequencies comprised in the third frequency band $B_3$ exceed the frequencies comprised in the first frequency band $B_1$, according to some aspects by a factor between two and five.

In this example, the node 1 comprises a second power distribution device 7 that is arranged to add the additional signal $S_3$ from oscillator 6 the to the output signals $S_1$ that are arranged to be radiated by the antenna arrangement 2. The second power distribution device 7 is here connected between the first power distribution device 5 and the antenna arrangement 2. According to some aspects, the oscillator 6 is connected via an amplifier arrangement 11.

Figure 3:
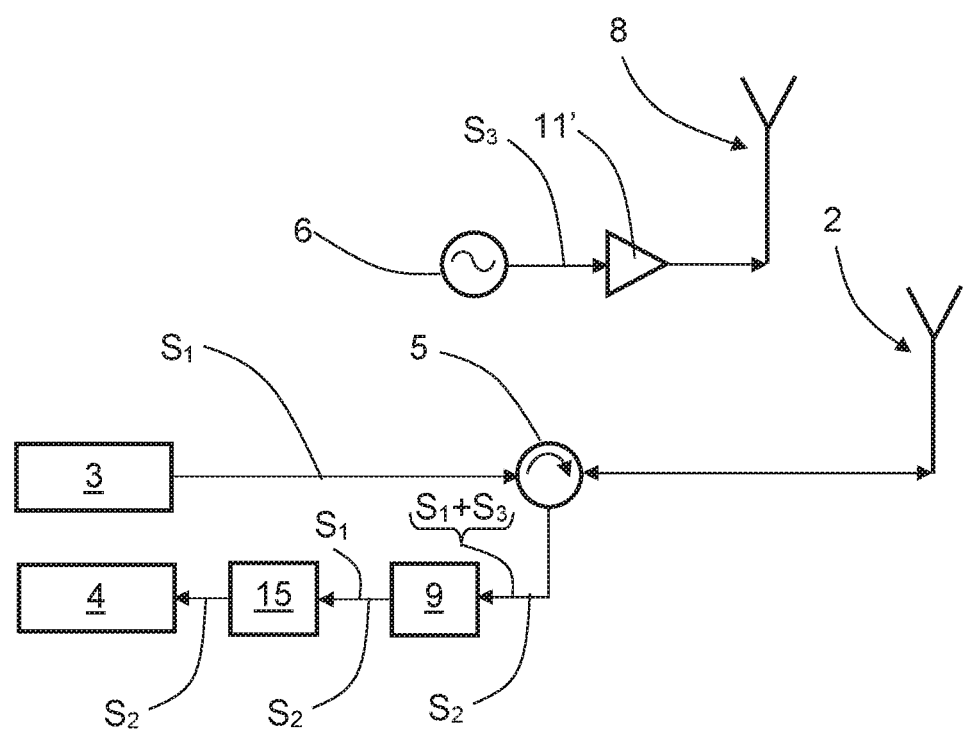
FIG. 3 shows a schematic view of an arrangement according to a second example of the present disclosure.

According to a second example, with reference to FIG. 1 and FIG. 3, a node 1' comprises an additional antenna arrangement 8, where the oscillator 6 instead is connected to the additional antenna arrangement 8 and arranged to radiate the additional signal $S_3$ via the additional antenna arrangement 8. In this way, the additional signal $S_3$ is added to the output signals $S_1$ in the air. According to some aspects, the oscillator 6 is connected via an amplifier arrangement 11'.

For both examples, according to some aspects, the additional signal $S_3$ is in the form of a continuous wave having one main frequency, having a bandwidth that is zero, or practically, close to zero.

Figure 4:
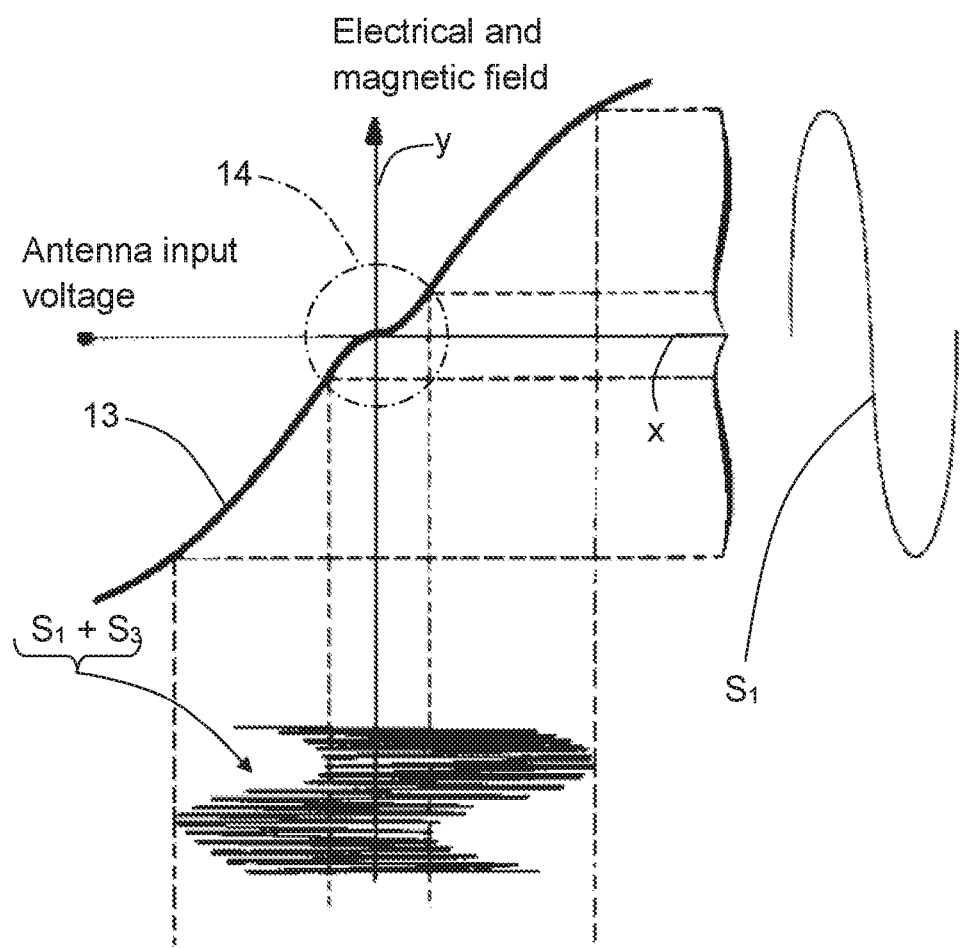
FIG. 4 shows a graphical representation of a transfer function between input voltage and output electrical field.

In the following, FIG. 4 will also be referred to. FIG. 4 shows input voltage to the antenna arrangement on the x-axis and electrical and magnetic field output from the antenna arrangement 2, as well as reflected electrical and magnetic field, on the y-axis. A node that suffers from passive intermodulation (PIM) can be modelled as a system with a transfer function 13 between input voltage and output electrical field. The transfer function 13 comprises a non-linear section 14 that for example is caused by PIM sources such as non-linear junctions; for example unintended diodes, and also metals like iron, stainless steel, nickel, zinc, cobalt and the like that exhibit non-linear characteristics that indicate that non-linarites exist at certain low signal levels. It is not desirable that intermodulation products caused by PIM enter the receiver arrangement 4.

Transmitted signals $S_1$ will be distorted by the non-linear part 14 of the transfer function 13, and it is the purpose of the added additional signal $S_3$ to prevent the transmitted signals $S_1$ from being affected by the non-linear part 14 of the transfer function 13. More in detail, the present disclosure relates to adding an additional signal $S_3$ to a output signals $S_1$ such that a combined signal $S_1+S_3$ is obtained for transmission to another wireless device 12. A part of the additional signal $S_3$ will be distorted by means of the non-linear part 14 of the transfer function 13 that causes PIM, while the output signals $S_1$ that will have the shape of the combined signal $S_1+S_3$ is left unaffected.

By suppressing the additional signal $S_3$, the undistorted output signal $S_1$ is obtained. For this purpose, the node 1 further comprises a first receiver filter 9 that is connected between the receiver arrangement 4 and the first power distribution device 5. The receiver filter 9 is arranged to prevent the additional signal $S_3$ from reaching the receiver arrangement 4. In practice, a part of the output signals $S_1$ leak through the first power distribution device 5, and therefore the combined signal $S_1+S_3$ according to the above is filtered in the first receiver filter 9 such that corresponding undistorted output signals are obtained at the receiver arrangement 4. The receiver filter 9 is therefore generally arranged to prevent any additional signal according to the above to reach the receiver arrangement 4.

After the first receiver filter 9, there is a second receiver filter 15 that is arranged to suppress the remaining output signals $S_1$ such that practically only the desired input signals $S_2$ reach the receiver arrangement 4.

One receiver filter or both receiver filters 9, 15 may according to some aspects be comprised in the receiver arrangement 4. The receiver filters 9, 15 may also according to some aspects be combined into one receiver filter arrangement that either is externally coupled to the receiver arrangement 4 or comprised in the receiver arrangement 4. Typically, the first receiver filter 9 has low-pass characteristics, and the second receiver filter 15 has band-pass characteristics.

The present disclosure is not limited to the above, but may vary within the scope of the appended claims. For example, each one of the power distribution devices 5, 7 may be constituted by:
  a filter combiner;
  a diplexer;
  a directional coupler; or
  a circulator.

Which parts that are placed in the radio arrangement 10 and which parts that are placed in the antenna arrangement 2 may vary, for example the oscillator 6 and the power distribution device 7 may be comprised in the antenna arrangement 2.

The node 1 may comprise several antenna arrangements and several radio arrangements where one or more of these according to some aspects are arranged for adding the additional signal $S_3$.

A radio arrangement may comprise more than one transmitter arrangement 3 and more than one receiver arrangement 4.

A radio arrangement is normally comprised by many separate parts such as one or more oscillators, digital-to-analog converters and/or mixers, and there may be more than one radio arrangement.

In the drawings, the same reference number has been used in different drawings for recurring details.

In this context, a node is constituted by a wireless communication device such as a base station, repeater station, user terminal or similar. The wireless device 12 is constituted by a repeater station or a user terminal, such as a UE (User Equipment).

Generally, the present disclosure relates to a wireless communication network node 1, 1' comprising an antenna arrangement 2, a transmitter arrangement 3 that is arranged to transmit output signals $S_1$ of a first frequency band $B_1$, a receiver arrangement 4 that is arranged to receive input signals $S_2$ of a second frequency band $B_2$, and a first power distribution device 5 that is arranged to distribute power between said antenna arrangement 2 and both of said transmitter arrangement 3 and said receiver arrangement 4, wherein the node 1, 1' further comprises an oscillator 6 that is arranged to supply an additional signal $S_3$ of a third frequency band $B_3$ that is added to the output signals $S_1$, where the frequencies comprised in the third frequency band $B_3$ exceed the frequencies comprised in the first frequency band $B_1$, where the node 1, 1' further comprises a receiver filter 9 that is arranged to prevent the additional signal $S_3$ from reaching the receiver arrangement 4.

According to an example, the additional signal $S_3$ is in the form of a continuous wave having one main frequency.

According to an example, the node 1 comprises a second power distribution device 7 that is arranged to add the additional signal $S_3$ to the output signals $S_1$ that are arranged to be radiated by the antenna arrangement 2.

According to an example, the node 1 comprises an additional antenna arrangement 8, where the oscillator 6 is arranged to radiate the additional signal $S_3$ via the additional antenna arrangement 8 such that the additional signal $S_3$ is added to the output signals $S_1$ in the air.

According to an example, each one of the power distribution devices 5, 7 is constituted by:
 a filter combiner;
 a diplexer;
 a directional coupler; or
 a circulator.

According to an example, the frequencies comprised in the third frequency band $B_3$ exceed the frequencies comprised in the first frequency band $B_1$ by at least a factor of two.

The invention claimed is:

1. A wireless communication network node comprising:
   an antenna arrangement,
   a transmitter arrangement that is arranged to transmit output signals of a first frequency band,
   a receiver arrangement that is arranged to receive input signals of a second frequency band,
   a first power distribution device that is arranged to distribute power between said antenna arrangement and both of said transmitter arrangement and said receiver arrangement, and
   an oscillator that is arranged to supply an additional signal of a third frequency band that is added to the output signals, where the frequencies comprised in the third frequency band exceed the frequencies comprised in the first frequency band, where the node further comprises a receiver filter that is arranged to prevent the additional signal from reaching the receiver arrangement.

2. The wireless communication network node according to claim 1, wherein the additional signal supplied by the oscillator is in the form of a continuous wave having one main frequency.

3. The wireless communication network node according to claim 1, wherein the node further comprises a second power distribution device that is arranged to add the additional signal to the output signals that are arranged to be radiated by the antenna arrangement.

4. The wireless communication network node according to claim 1, wherein the node further comprises an additional antenna arrangement, where the oscillator is arranged to radiate the additional signal via the additional antenna arrangement such that the additional signal is added to the output signals in the air.

5. The wireless communication network node according to claim 1, wherein each one of the power distribution devices comprises:
 a filter combiner;
 a diplexer;
 a directional coupler; or
 a circulator.

6. The wireless communication network node according to claim 1, wherein the frequencies comprised in the third frequency band exceed the frequencies comprised in the first frequency band by at least a factor of two.

\* \* \* \* \*